(12) United States Patent
Chen

(10) Patent No.: US 7,362,835 B2
(45) Date of Patent: Apr. 22, 2008

(54) CLOCK GENERATOR CIRCUIT AND RELATED METHOD FOR GENERATING OUTPUT CLOCK SIGNAL

(75) Inventor: Yu-Yang Chen, Taichung County (TW)

(73) Assignee: Mediatek Incorporation, Science-Based Industrial Park, Hsin-Chu Hsien (TW)

( * ) Notice: Subject to any disclaimer, the term of this patent is extended or adjusted under 35 U.S.C. 154(b) by 554 days.

(21) Appl. No.: 10/906,137

(22) Filed: Feb. 4, 2005

(65) Prior Publication Data

US 2006/0176940 A1 Aug. 10, 2006

(51) Int. Cl.
*H04L 7/00* (2006.01)
*H03K 3/84* (2006.01)

(52) U.S. Cl. ..................... 375/354; 327/164

(58) Field of Classification Search ........ 375/354–376, 375/326, 324, 322, 316; 327/100, 164, 172, 327/175, 141, 144, 145, 155, 162; 714/728, 714/726, 724, 699, 400, 401, 500–503, 600, 714/601

See application file for complete search history.

(56) References Cited

U.S. PATENT DOCUMENTS 6,606,004 B2 * 8/2003 Staszewski et al. ........... 331/17
6,737,904 B1 * 5/2004 Butaud et al. ............... 327/298

* cited by examiner

*Primary Examiner*—Mohammed Ghayour
*Assistant Examiner*—Vineeta Panwalkar
(74) *Attorney, Agent, or Firm*—Winston Hsu

(57) ABSTRACT

The present invention discloses a clock generator circuit for generating an output clock signal. The clock generator circuit includes: a random frequency code generator for generating a frequency code randomly, wherein the random frequency code generator is clocked by a first clock signal; an accumulator electrically connected to the random frequency code generator, for generating a selection code by accumulating the frequency code, wherein the accumulator is clocked by the first clock signal; a first multiplexer electrically connected to the accumulator, for selecting one of a plurality of reference clock signals as the first clock signal according to the selection code; and a toggle circuit electrically connected to the first multiplexer, being clocked by the first clock signal for generating the output clock signal.

13 Claims, 2 Drawing Sheets

CLOCK GENERATOR CIRCUIT AND RELATED METHOD FOR GENERATING OUTPUT CLOCK SIGNAL

BACKGROUND

The present invention relates to integrated circuits, and more particularly, to clock generator circuits that generate clock signals with selected frequency characteristics.

In a modern electronic system, there are always numerous integrated circuits that operate in a synchronous manner. In these kinds of electronic systems, the generation of periodic clock signals for clocking the operation of different circuit functions with a basic system clock (or a synchronization pulse) is an essential task that must be carefully performed.

FIG. 1 shows a clock generator circuit of the related art. The clock generator circuit 100 shown in this figure includes a multiplexer 120, an accumulator 125, and a toggle circuit 140. The accumulator 125 is made up of a register 130, which is a first delay flip-flop (DFF) in this example, and an adder 150. The toggle circuit 140 is a second DFF in this example. There are N reference clock signals being fed into the multiplexer 120. Each of the reference clock signals has the same period $T_{REF}$ but a different phase, wherein the phase difference between any two adjacent reference clock signals is a constant value which is $T_{REF}/N$ in this example. In other words, phase difference among the plurality of reference clock signals is the times of the constant value.

The multiplexer 120 selects a reference clock signal from the plurality of reference clock signals to generate a first clock signal $C_1$ according to a selection code SC received from the first DFF 130. The accumulator 125 generates the selection code SC by accumulating a fixed frequency code FC. More specifically, the adder 150 adds the fixed frequency code FC with the selection code SC fed back by the first DFF 130 to generate a preliminary selection code PSC, and the preliminary selection code PSC is used by the first DFF 130 to generate the selection code SC. The first DFF 130 operates in accordance with the first clock signal $C_1$, hence each time a rising edge occurs in the first clock signal $C_1$ (which is provided by one of the reference clock signals fed into the multiplexer 120), a newly generated selection code SC will be used to switch the multiplexer 120 and be fed back to the adder 150. The second DFF 140 is clocked by the first clock signal $C_1$, and an input of the second DFF 140 receives an output clock signal $C_{OUT}$ generated by an inverted output of the second DFF 140. Each time a rising edge occurs in the first clock signal $C_1$ (which is provided by one of the reference clock signals fed into the multiplexer 120), the state of the output clock signal $C_{OUT}$ will be inverted once.

The fixed frequency code FC is for controlling the clock generator circuit 100, indicating the number of adjacent phase(s) of the reference clock signals fed into the multiplexer 120 are going to be elapsed between two rising edges of the first clock signal $C_1$. As for the output clock signal $C_{OUT}$, the fixed frequency code FC indicates the number of adjacent phase(s) of the reference clock signals fed into the multiplexer 120 are going to be elapsed between each pair of adjacent rising edge and falling edge of the output clock signal $C_{OUT}$. Hence the frequency of the output clock signal $C_{OUT}$ is digitally controlled by the frequency code FC. Assuming that each of the N reference clock signals fed into the multiplexer 120 have a same frequency $f_{REF}$ and the frequency code FC is set as 1, the output clock signal $C_{OUT}$ will have a frequency equal to $(N/2) \times f_{REF}$. By setting the frequency code FC as 2, the output clock signal $C_{OUT}$ will have a frequency equal to $(N/4) \times f_{REF}$. Additionally, by setting the frequency code FC as n (where $1 \leq n \leq N$), the output clock signal $C_{OUT}$ will have a frequency equal to $(N/2n) \times f_{REF}$. In the clock generator circuit 100 of the related art, the number of possible frequencies that the output clock signal $C_{OUT}$ could have is quite limited and is determined by the number N of the reference clock signals. It is therefore desired to provide a new clock generator circuit that can generate an output clock signal with a larger selection of possible frequencies.

SUMMARY

It is therefore an objective of the claimed invention to provide a clock generator circuit that is capable of providing an output clock signal with a larger selection of possible frequencies.

According to the claimed invention, a clock generator circuit for generating an output clock signal is disclosed. The clock generator circuit comprises: a random frequency code generator for generating a frequency code randomly, wherein the random frequency code generator is clocked by a first clock signal; an accumulator electrically connected to the random frequency code generator, for generating a selection code by accumulating the frequency code, wherein the accumulator is clocked by the first clock signal; a first multiplexer electrically connected to the accumulator, for selecting one of a plurality of reference clock signals as the first clock signal according to the selection code; and a toggle circuit electrically connected to the first multiplexer, being clocked by the first clock signal for generating the output clock signal.

Also according to the claimed invention, a method for generating an output clock signal is disclosed. The method comprises the following steps: generating a frequency code randomly in accordance with a first clock signal; accumulating the frequency code to generate a selection code in accordance with the first clock signal; selecting one clock signal from a plurality of reference clock signals to generate the first clock signal according to the selection code; toggling a flip-flop with the first clock signal to generate the output clock signal; and repeating the generating, accumulating, selecting, and toggling steps.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
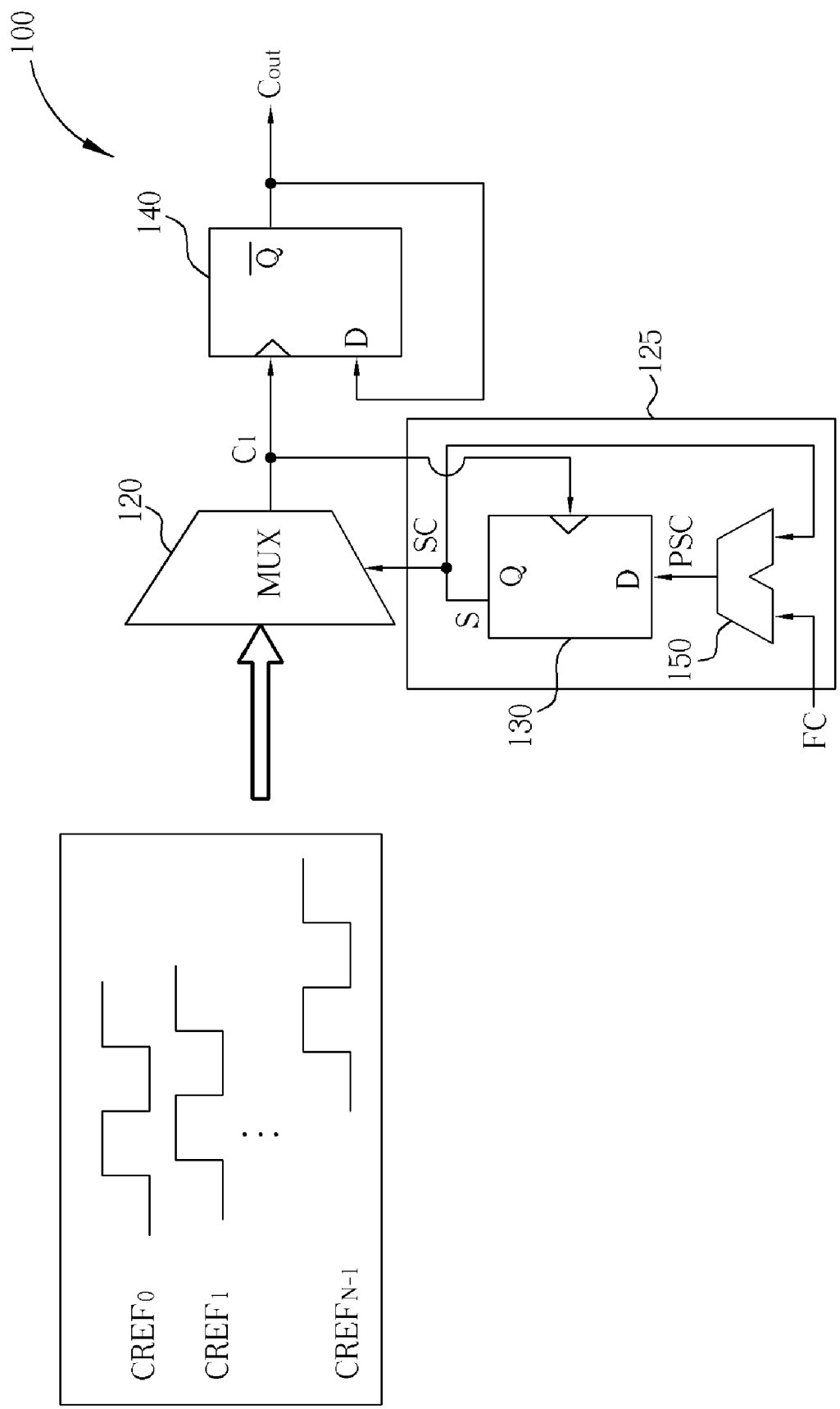
FIG. 1 shows a clock generator circuit of the related art.
Figure 2:
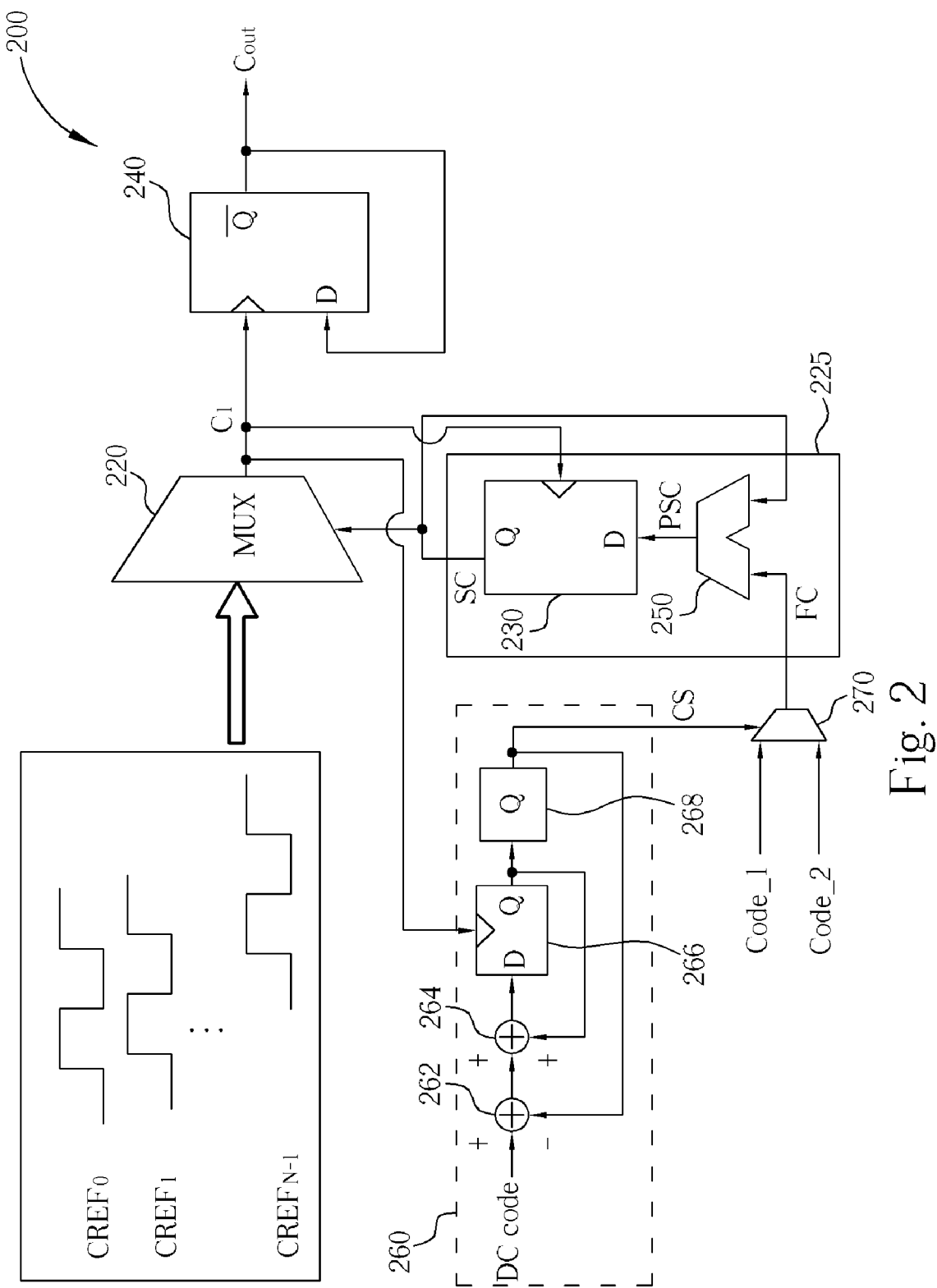
FIG. 2 shows a clock generator circuit according to an exemplary embodiment of the present invention.

Referring to FIG. 2, a clock generator circuit according to an exemplary embodiment of the present invention is illustrated. In FIG. 2, the clock generator circuit 200 comprises a first multiplexer 220, an accumulator 225, a toggle circuit 240, and a random frequency code generator, which is made up of a random signal generator 260 and a second multiplexer 270. The accumulator 225 is made up of a register 230, which is a first delay flip-flop 230 in this embodiment, and an adder 250. The toggle circuit 240 is a second DFF 240 in this embodiment. There are N reference clock signals being fed into the multiplexer 220. Each of the reference clock signals has the same period $T_{REF}$ and the same frequency $f_{REF}$ but a different phase, wherein the phase difference between any two adjacent reference clock signals is a constant value, which is $T_{REF}/N$ in this example. In other words, phase difference among the plurality of reference clock signals is the times of the constant value.

The first multiplexer 220 selects a reference clock signal form the plurality of reference clock signals to generate a first clock signal $C_1$ according to a selection code SC received from the first DFF 230. The accumulator 225 generates the selection code SC by accumulating a randomly generated frequency code FC. More specifically, the adder 250 adds the randomly generated frequency code FC with the selection code SC fed back by the first DFF 230 to generate a preliminary selection code PSC. The first DFF 230 operates in accordance with the first clock signal $C_1$ to generate the selection code SC according to the preliminary selection code PSC. Hence, each time a rising edge occurs in the first clock signal $C_1$ (which is provided by one of the reference clock signals fed into the first multiplexer 220), a newly generated selection code SC will be used to switch the first multiplexer 220 and be fed back to the adder 250. The second DFF 240 is clocked by the first clock signal $C_1$, and an input of the second DFF 240 receives an output clock signal $C_{OUT}$ generated by an inverted output of the second DFF 240. Each time a rising edge occurs in the first clock signal $C_1$ (which is provided by one of the reference clock signals fed into the multiplexer 220), the state of the output clock signal $C_{OUT}$ will be inverted once.

As for the random frequency code generator (which is made up of the random signal generator 260 and the second multiplexer 270), it is for generating the frequency code FC randomly. In this embodiment, the second multiplexer 270 selectively outputs one preset frequency code from a plurality of preset frequency codes to be the frequency code FC according to a randomly generated control signal CS. In FIG. 2, only two preset frequency codes (code_1 and code_2) are shown; however, more than two different codes could be used here. For example, the second multiplexer 270 can selectively output one of a $2^M$ number of preset frequency codes (code_1, code_2, . . . , code_$2^M$) to be the frequency code FC according to a randomly generated M-bit control signal CS, where M is a positive integer. These alternative designs all fall into the metes and bounds of the present invention. The random signal generator 260 is used to generate the control signal CS randomly. As is well known in the art, a good example of random signal generators is a sigma-delta modulator (SDM), which is also called delta-sigma modulator (DSM). It is preferred that a first order or second order SDM is used in the clock generator circuit of the present invention. This preference is because SDMs with lower order have a more predictable result and more stable operation. However, the present invention is not limited by the above mentioned low order constraint.

In the random signal generator 260 of FIG. 2, a DC code is used to determine the probability of appearance for each possible value of the control signal CS. For example, if the control signal CS has two possible values, which are '0' and '1' respectively, the probability of control signal CS appearing as '0' and the probability of control signal CS appearing as '1' would be determined by the DC code. An adder 262 and an adder 264 are used for the "delta" operation and the "sigma" operation, respectively. A third delay flip-flop (DFF) 266 is used for providing a "unit delay", that is, a delay equal to one sampling period. Although it is shown in FIG. 2 that the first clock signal $C_1$ generated by the first multiplexer 220 is fed into a clock input of the third DFF 266 for driving the third DFF 266, the present invention is not limited to this particular structure. A quantizer 268 of the random signal generator 260 receives a bit (preferably the sign bit in this embodiment) of the signal outputted by the third DFF 266 to generate the control signal CS. In this embodiment, since there are only two possible preset frequency codes that could be provided by the second multiplexer 270, taking only the sign bit out to be the control code CD will be enough for controlling the switch 272 suitably. However, if there are more possible preset frequency codes that could be selected by the second multiplexer 270, more than one bits of the signal outputted by the DFF 266 should be taken by the quantizer 268 for controlling the second multiplexer 270.

Since the control signal CS is randomly generated, the frequency code FC will be randomly switched between code_1 and code_2. The probability that the frequency code FC being the code_1 or the code_2 is determined by the DC code. When code_1 is continuously selected as the frequency code FC, the output clock signal $C_{OUT}$ will have a frequency equal to $[N/(2\times code\_1)]\times f_{REF}$. When code_2 is continuously selected as the frequency code FC to control the adder 250, the output clock signal $C_{OUT}$ will have a frequency equal to $[N/(2\times code\_2)]\times f_{REF}$. When the frequency code FC is randomly alternated between code_1 and code_2 with a expectation value code_E, which lies between code_1 and code_2, the clock generate circuit 200 will effectively operate as if it is controlled by a code_E continuously selected as frequency code FC, and the output clock signal $C_{OUT}$ will have a frequency $[N/(2\times code\_E)]\times f_{REF}$, which lies between $[N/(2\times code\_1)]\times f_{REF}$ and $[N/(2\times code\_2)]\times f_{REF}$. Hence, rather than only having a frequency being equal to $[N/(2\times I)]\times f_{REF}$, where I is an integer lies between 1 and N; it is also possible that the output clock signal $C_{OUT}$ has a frequency being equal to $[N/(2\times J)]\times f_{REF}$, where J could be a real number between 1 and N. That is, by utilizing the random frequency code generator, the clock generator circuit 200 in this embodiment has more possible frequency selections than that of the related art.

In addition, since the clock generator circuit 200 in this embodiment could generate the output clock signal $C_{OUT}$ being not purely periodic (i.e. when the frequency code FC is randomly switched between a plurality of preset frequency codes, the frequency of the output clock signal $C_{OUT}$ would be fluctuating rather than be fixed), it is suitable for use in some electrical systems that require non-pure periodic clock signals to operate. However, if a periodic characteristic is required, there could also be another phase lock loop (PLL) or fractional-N PLL attached to the output of the second DFF 240 for generating another more purely periodic output clock signal $C'_{OUT}$.

Furthermore, the above-mentioned embodiment of the present invention has other advantages. To make the frequency of the output clock signal $C_{OUT}$ lying between $[N/(2\times code\_1)]\times f_{REF}$ and $[N/(2\times code\_2)]\times f_{REF}$, it will conspicuously suppress the spurs appearing in the frequency domain of the output clock signal $C_{OUT}$ by generating the frequency code FC "randomly" rather than using a regular manner to generate the frequency code FC (i.e. switching between code_1 and code_2 periodically to generate the frequency code FC).

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A clock generator circuit for generating an output clock signal, comprising:
   a random frequency code generator for generating a frequency code randomly, wherein the random frequency code generator is clocked by a first clock signal;
   an accumulator electrically connected to the random frequency code generator, for generating a selection code by accumulating the frequency code, wherein the accumulator is clocked by the first clock signal;
   a first multiplexer electrically connected to the accumulator, for selecting one of a plurality of reference clock signals as the first clock signal according to the selection code; and
   a toggle circuit electrically connected to the first multiplexer, being clocked by the first clock signal for generating the output clock signal;
   wherein the random frequency code generator comprises:
   a random signal generator, being clocked by the first clock signal for generating a control signal randomly; and
   a second multiplexer electrically connected to the random signal generator and the accumulator, for selecting one preset frequency code from a plurality of preset frequency codes to be the frequency code according to the control signal.

2. The clock generator circuit of claim 1, wherein phase difference among the plurality of reference clock signals is the times of a constant value.

3. The clock generator circuit of claim 1, wherein both the frequency code and the selection code have N bits, wherein N is a positive integer.

4. The clock generator circuit of claim 1, wherein the number of the preset frequency codes is 2 and the control signal is a 1-bit signal.

5. The clock generator circuit of claim 1, wherein the number of the preset frequency codes is $2^M$ and the control signal is an M-bit signal, wherein M is a positive integer.

6. The clock generator circuit of claim 1, wherein the random signal generator comprises a sigma-delta modulator being clocked by the first clock signal.

7. The clock generator circuit of claim 6, wherein the sigma-delta modulator is a first order or second order sigma-delta modulator.

8. The clock generator circuit of claim 1, wherein the accumulator comprises:
   an adder electrically connected to the random frequency code generator, for adding the frequency code with the selection code to generate a preliminary selection code; and
   a register electrically connected to the adder and the first multiplexer, being clocked by the first clock signal and for receiving the preliminary frequency selection code and generating the selection code.

9. A method for generating an output clock signal, comprising:
   generating a frequency code randomly in accordance with a first clock signal;
   accumulating the frequency code to generate a selection code in accordance with the first clock signal;
   selecting one clock signal from a plurality of reference clock signals to generate the first clock signal according to the selection code;
   toggling a flip-flop with the first clock signal to generate the output clock signal; and
   repeating the generating, accumulating, selecting, and toggling steps;
   wherein the generating step further comprises:
   using a sigma-delta modulator to generate a control signal randomly; and
   selecting one preset frequency code from a plurality of preset frequency codes to be the frequency code according to the control signal.

10. The method of claim 9, wherein both the frequency code and the selection code have N bits, wherein N is a positive integer.

11. The method of claim 9, wherein the number of the preset frequency codes is $2^M$ and the control signal is an M-bit signal, wherein M is a positive integer.

12. The method of claim 9, wherein the number of the preset frequency codes is 2 and the control signal is a 1-bit signal.

13. The method of claim 9, wherein the accumulating step further comprises:
   adding the frequency code with the selection code to generate a preliminary selection code; and
   flip-flopping the preliminary frequency selection code for outputting generating the selection code, wherein the flip-flopping step is done in accordance with the first clock signal.

* * * * *